(12) United States Patent
Pei et al.

(10) Patent No.: US 6,226,732 B1
(45) Date of Patent: *May 1, 2001

(54) MEMORY SYSTEM ARCHITECTURE

(75) Inventors: Chih-Yuan Pei, Saratoga; Kimihiro Sugino, San Jose, both of CA (US)

(73) Assignee: Hitachi Micro Systems, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,854

(22) Filed: Oct. 2, 1997

(51) Int. Cl.[7] .................................................. G06F 12/10
(52) U.S. Cl. ............................................................ 711/207
(58) Field of Search ................................... 711/206, 207, 711/208

(56) References Cited

U.S. PATENT DOCUMENTS

| | | | | |
|---|---|---|---|---|
| 4,926,316 | * | 5/1990 | Baker et al. | 364/200 |
| 5,237,671 | * | 8/1993 | Freitas et al. | 711/207 |
| 5,835,964 | * | 11/1998 | Draves et al. | 711/207 |
| 5,848,231 | * | 12/1998 | Teitelbaum et al. | 395/186 |
| 6,069,638 | * | 5/2000 | Porterfield | 395/516 |

* cited by examiner

*Primary Examiner*—Kevin L. Ellis
(74) *Attorney, Agent, or Firm*—Squire, Sanders & Dempsey, L.L.P.

(57) ABSTRACT

A memory architecture includes a virtual memory system and a physical memory system. For one mode of operation all memory accesses are performed within the virtual memory system. For a second mode of operation, accesses within a range of shadowed addresses are redirected to the physical memory system. Addresses outside of the range of shadowed addresses are still performed by the virtual memory system.

11 Claims, 2 Drawing Sheets

MEMORY SYSTEM ARCHITECTURE

FIELD OF THE INVENTION

The present invention relates generally to memory systems for computers and other data processing systems. More specifically, the present invention includes a memory architecture having one or more virtually addressable segments and one or more physically addressable segments.

BACKGROUND OF THE INVENTION

Computers and other data processing systems generally include some form of memory system. Typically these memory systems are organized as a sequence of memory locations with each location storing a fixed number of memory bits. Each memory location is accessed using its own numeric address. Thus, the first memory location has a numeric address of zero. The second has an address of one, and so on. These numeric addresses are known as physical addresses.

The use of physical addresses (physical addressing) is a simple and fast method for addressing the contents of a memory system. Consequently, physical addressing is used in a wide range of computer system types. For example, cost is a paramount issue in many embedded computers. Thus, the simplicity of physical addressing is often appropriate for these computers. In computer systems used for digital signal processing, speed of execution may be paramount. As a result, physical addressing is often appropriate for these computer systems as well.

Virtual addressing is a technique that builds onto and extends the physical addressing model. In virtual addressing, memory locations are accessed using numeric addresses known as virtual addresses. The virtual addresses are then translated or mapped into physical addresses to perform the requested access. The mappings between virtual addresses and physical addresses are established at runtime, generally on a per-process basis. Thus, each process will have its own, unique mapping between virtual addresses and physical addresses. The per-process mapping between virtual addresses and physical addresses may also be dynamic. Thus, the physical address referenced by a virtual address may change over the life a process.

The use of virtual addresses has a number of advantages. For example, using virtual addresses a set of processes be loaded into the same memory system. Each process is then given a range of virtual addresses that starts at zero. Each processes' range of virtual addresses is then mapped to a different set of physical addresses. In this way, a single memory system is shared between the set of processes.

Virtual addressing may also be used to provide systems where the range of virtual addresses exceeds the range of physical addresses. Typically, this is accomplished by dividing a process' range of virtual addresses into a series of regions or pages. The pages of memory are stored within a secondary storage system such as a disk drive. When a process needs a particular page, the page is moved into the memory system. As the page is moved into the memory system, the process' mapping between virtual addresses and physical addresses is updated to reflect the physical address of the page within the memory system. Importantly, by storing pages within a secondary storage system, it becomes possible for number of pages to exceed the number of locations available within the memory system (i.e., each process may have more pages than will 'fit' within the memory system). In this way, it is possible to create systems where the range of virtual addresses exceeds the range of physical addresses.

The addition of virtual addressing greatly enhances the flexibility of memory systems. Unfortunately, this increase in flexibility is typically achieved by slowing down the speed of the memory system. This decrease in speed is attributable to the time required to translate each virtual address to its corresponding physical address. The translation time may be partially masked by providing a cache for recently translated virtual addresses. Still, it is generally the case that virtual addressing cannot match the speed of physical addressing.

The difference in speed, complexity and flexibility provided by virtual addressing and physical addressing has generally caused designers of computer systems to choose between the two methods. Thus, general purpose computers are typically designed to use virtual addresses. Specialized computers, such as digital signal processing systems, and embedded systems are typically designed to use physical addressing.

Increasingly, however, there is a need for memory systems that provide the speed of physical addressing and the flexibility of virtual addressing. For example, in highly integrated systems, like advanced handheld computers, there is a need for a range of different processes. Some of these processes are akin to the processes typically executed by general purpose computers. Other processes perform digital signal processing or embedded tasks. As a result, these integrated computers have a need for the speed of physical addressing and the flexibility of virtual addressing. Thus, a need exists for memory systems that combine these advantages.

SUMMARY OF THE INVENTION

The present invention is directed to a memory system including memory that is accessible using physical addresses and memory that is accessible using virtual addressees. The portions of memory accessible using physical addresses exhibit the advantages of speed and relative simplicity. The portions of memory accessible using virtual addressing exhibit advantages such as flexibility. The invention includes a memory architecture having a virtual memory system and a physical memory system. The virtual memory system and physical memory system may be connected to a common address bus and a control bus. The virtual memory system includes a memory management unit (MMU) that translates virtual addresses to physical addresses. The virtual memory system also includes a cache memory unit. The physical memory system includes an auxiliary memory array and a main memory array.

The memory architecture includes several modes of operation. For one such mode of operation, the control bus is configured to indicate that the auxiliary memory array is disabled. A virtual address is then placed on the address bus. The MMU receives the virtual address and translates the virtual address to its corresponding physical address. The virtual memory unit then uses the physical addresses to access the correct memory location in the cache memory unit or the main memory array.

For a second mode of operation, the control bus is configured to indicate that the auxiliary memory array is enabled. A virtual address is then placed on the address bus. The MMU receives the virtual address and compares it to a range of shadowed addresses. If the virtual address is within the range of shadowed addresses, the MMU uses the virtual addresses to access the correct memory location in the auxiliary memory array. Alternatively, if the virtual address is not within the range of shadowed addresses, the virtual memory system performs the access as previously described.

The present invention may also include third and fourth modes of operation where the address translation within the MMU is disabled. In the third mode, the virtual memory system is disabled. In this mode, all memory addresses are physical addresses and all memory addresses are located in the main memory array. In the fourth mode of operation, all memory addresses are once again physical addresses. For the fourth mode, however, a range of shadowed addresses are located in the auxiliary memory array. The present invention may also include a fifth mode of operation where the virtual memory system and main memory array are disabled and the auxiliary memory array is active.

The combination of the virtual memory system and the physical memory system provides an environment where applications that require maximum execution speed can be accommodated while still maintaining the flexibility of a virtual memory architecture.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

Figure 1:
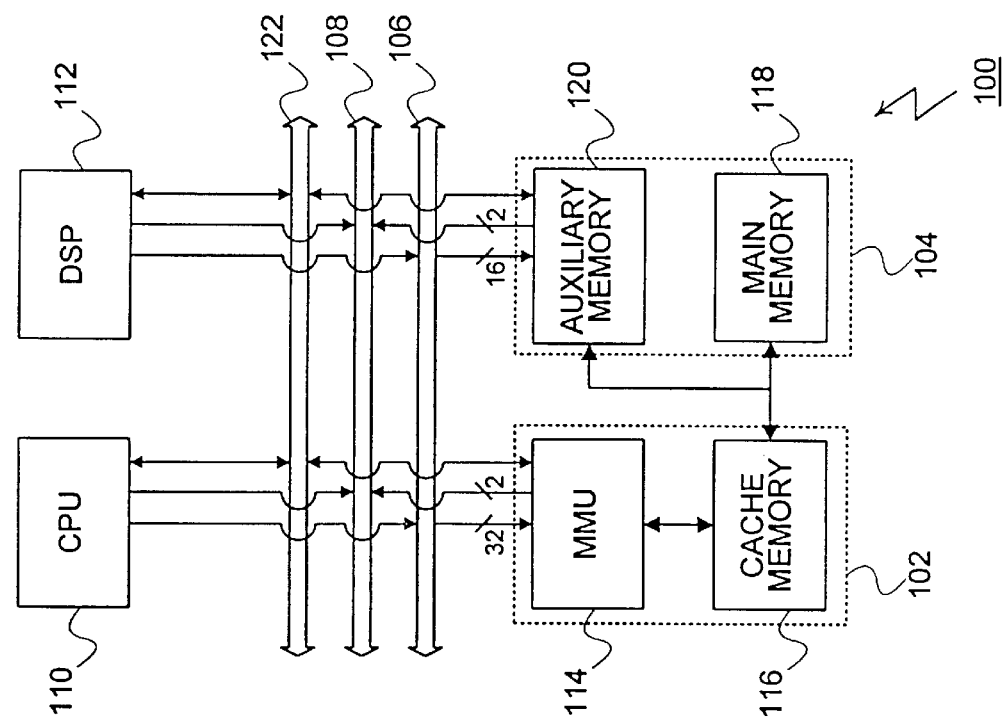
FIG. 1 is a block diagram of a memory architecture as used in a preferred embodiment of the present invention.

The present invention includes a memory architecture for computers and other data processing systems. In FIG. 1, a representative embodiment of the memory architecture of the present invention is shown and generally designated 100. Memory architecture 100 is preferably implemented within a single integrated circuit and includes a virtual memory system 102 and a physical memory system 104. Memory architecture 100 also includes a common address bus 106 and a control bus 108. For purposes of illustration, it may be assumed that address bus 106 is thirty-two bits in width and that control bus 108 is two bits in width. It is easily appreciated, however, that other bus widths will be appropriate for other embodiments of the present invention. Virtual memory system 102 is connected to address bus 106 with a thirty-two bit connection. Physical memory system 104 is connected to address bus 106 using a sixteen bit connection. The width of the connections between virtual memory system 102, physical memory system 104 and address bus 106 are representative.

To use virtual memory system 102 and physical memory system 104, one or more processors are connected to address bus 106 and control bus 108. For purposes of illustration, FIG. 1 shown a central processing unit (CPU) 110 and a digital signal processor (DSP) 112 connected to address bus 106 and control bus 108.

Figure 2:
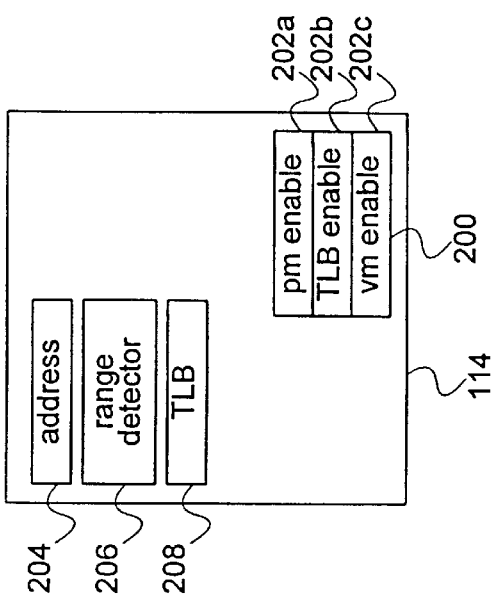
FIG. 2 is a block diagram of a memory management unit (MMU) as used in a preferred embodiment of the present invention.

Virtual memory system 102 includes a memory management unit (MMU) 114 for translating virtual addresses into physical addresses. Referring briefly to FIG. 2, it may be seen that MMU 114 includes a status register 200. Status register is accessible from CPU 110 or DSP 112 and is intended to be representative of a range of methods for controlling operation of MMU 114 and memory architecture 100. FIG. 2 also indicates that status register 200 is included within MMU 114. Once again, this is for purposes of illustration and other embodiments may locate status register 200 within other portions of memory architecture 100.

Status register 200 includes three bits 202a through 202c. These bits include auxiliary physical memory enable bit 202a for enabling or disabling operation of auxiliary memory system 120. Status register 200 also includes TLB enable bit 202b for enabling or disabling address translation within MMU 114. Virtual memory enable bit 202c for enabling or disabling operation of virtual memory system 102 is also included. It should be appreciated that the particular bits 202 are representative and that more or fewer bits may be required for a particular embodiment of the present invention.

MMU 114 also includes an address register 204, range detector 206 and a translation look aside buffer (TLB) 208. Address register 204 is a latch or other device that receives virtual addresses from address bus 106. Range detector 206 is a device that allows MMU 114 to determine if a received address is included within a range of shadowed addresses. Range detector 206 may be implemented using a range of devices. For one implementation, range detector 206 is a decoder that compares the high-order (most significant) bits included in address register 204 to a predetermined value. If the higher order bits match the fixed value, range detector 206 determines that the received virtual address is within the range of shadowed addresses. Alternatively, range detector 206 may be implemented to compare the high-order bits included in address register 204 to a value included in a register included within MMU 114 (register not shown). This comparison may be performed using a comparator or other technique. The register within MMU 114 may be modifiable by CPU 110 or DSP 112 allowing the range of shadowed addresses to be set dynamically.

TLB 208 corresponds to the devices used by MMU 114 to translate the virtual addresses included in address register 204 to physical addresses. TLB 208 may be selected from a wide range of TLB types.

Virtual memory system 102 also includes a cache memory unit 116. Cache memory 116 may be selected from commercially available types or specially fabricated. Within virtual memory system 102, MMU 114 is shown to be connected to cache memory unit 116. Cache memory unit 116 is shown to be connected, in turn, to physical memory system 104. Importantly, it should be realized that the interconnections shown are intended to be representative. Thus, virtual memory system 102 could just as easily be shown with MMU 114 connected directly to both cache memory 116 and physical memory system 104. Alternatively, in cases where cache memory 116 is a virtual cache, virtual memory system 102 could be shown with cache memory 116 preceding both MMU 114 and physical memory system 104.

Physical memory system 104 includes a main memory array 118 and an auxiliary memory array 120. Main memory array 118 and auxiliary memory array 120 are intended to be representative of a wide range of randomly accessible memory types including static, dynamic, non-volatile, page mode and other types. The storage sizes of main memory array 118 and auxiliary memory array 120 may also be chosen from a wide range of storage sizes including bit, byte, half-word, word, and double word sizes. Importantly, for the illustrated embodiment, auxiliary memory array 120 is connected to address bus 106 using a sixteen bit connection. Auxiliary memory array 120 is dimensioned to reflect the width of the connection between physical memory system 104 and address bus 106. Thus, for the illustrated embodiment, auxiliary memory array 120 includes $2^{16}$ or 65566 different memory locations. Other embodiments, having wider or narrower connections between physical memory system 104 and address bus 106 will have more or fewer memory locations, respectively.

For completeness, memory architecture 100 is shown to include a data bus 122. For purposes of illustration, it may be assumed that data bus 122 is thirty-two bits in width. It is easily appreciated, however, that other bus widths will be appropriate for other embodiments of the present invention. Virtual memory system 102 and physical memory system 104 are connected to data bus 122 with thirty-two bit connections. The width of these connections are representative.

Memory architecture 100 includes several operational modes. For a first mode of operation, CPU 110 or DSP 112 configures memory architecture 100 to disable operation of auxiliary memory array 120. In general, the method used by CPU 110 or DSP 112 to disable access to auxiliary memory array 120 is implementation dependent. For the illustrated embodiment, CPU 110 or DSP 112 performs this function by configuring bit 202a in status register 200 to disable operation of auxiliary memory array 120. In response, status register 200 provides a signal to control bus 108 causing auxiliary memory array 120 to be disabled.

After disabling auxiliary memory array 120, CPU 110 or DSP 112 places a virtual address on address bus 106. The virtual address is received by address register 204 of MMU 114. TLB 208 then translates the virtual address into a physical address. The physical address is then passed to cache memory unit 116. If cache memory unit 116 includes the memory location specified by the physical address, the location is accessed for CPU 110 or DSP 112. Alternatively, if the memory location specified by the physical address is not present in cache memory unit 116, then the physical address is passed to physical memory system 104, which includes the main memory array 118 and auxiliary memory array 120. The memory location within main memory array 118 specified by the physical address is then accessed for CPU 110 or DSP 112.

In the preceding description, memory within cache memory unit 116 or physical memory system 104 is accessed for CPU 110 or DSP 112. It should be understood that access, in this context, is intended to refer to either reading or writing operations. It should also be appreciated that depending on the configuration of cache memory unit 116 and physical memory system 104 it is possible for a single access to involve more than a single memory location. Thus, for example, cache memory unit 116 and physical memory system 104 may be configured to provide simultaneous access to a X memory and a Y memory word for each access operation.

It should also be appreciated that the steps described in the preceding description are dependent on the particular embodiment shown for virtual memory system 102. In particular, if cache memory unit 116 is configured as a virtual cache, or if physical memory system 104 and cache memory unit 116 are placed in a parallel configuration, the order of the described steps may differ in ways that will be apparent to one of ordinary skill based upon the present discussion.

For a second mode of operation, CPU 110 or DSP 112 configures memory architecture 100 to enable operation of auxiliary memory array 120. CPU 110 or DSP 112 performs this function by configuring bit 202a of status register 200 to enable operation of auxiliary memory array 120. In response, status register 200 provides a control signal to control bus 108 causing auxiliary memory array 120 to be enabled.

After enabling auxiliary memory array 120, CPU 110 or DSP 112 places a virtual address on address bus 106. The virtual address is received by address register 204 of MMU 114. Range detector 206 then determines if the received virtual address is included within the range of shadowed addresses. Typically, range detector 206 will be configured to accomplish this task by examining the higher order (most significant) bits of the received virtual address. In cases where range detector 206 determines that the received virtual address is not within the range of shadowed addresses, virtual memory system 102 handles the requested access in the same manner as previously described. Thus, in these cases, TLB 208 generates a physical address and the access is performed using cache memory unit 116 and physical memory system 104.

In the alternative, where range detector 206 determines that the received virtual address is within the range of shadowed addresses, MMU 114 provides a signal to control bus 108 causing auxiliary memory array 120 to be activated. Upon activation, physical memory system 104 uses the low order (least significant) bits of the virtual address to access auxiliary memory array 120 for CPU 110 or DSP 112. In the described embodiment, the high order bits of the virtual address are used to determine if the virtual address is included in the range of shadowed addresses. The low order bits are then used to find the desired location within the auxiliary memory array 120. It should be appreciated that these two tasks might be performed using different groupings of bits within the received virtual address. Such alternative embodiments are within the scope of the present invention and will be understood by one of ordinary skill.

In the preceding description, memory within auxiliary memory array 120 is accessed for CPU 110 or DSP 112. It should be understood that access, in this context, is intended to refer to either reading or writing operations. It should also be appreciated that, depending on the configuration of auxiliary memory array 120, it is possible for a single access to involve more than a single memory location. Thus, for example, auxiliary memory array 120 may be configured to provide simultaneous access to an X memory and a Y memory word for each access operation.

Memory architecture 100 may also be configured to provide third and forth modes of operation. These modes of operation may be selected by CPU 110 or DSP 112 through the use of status register 200. For the third mode of operation, bits 202a and 202b of status register 200 are set to disable auxiliary memory array 120 and to disable address translation within MMU 114. As a result, for the third mode, main memory array 118 and auxiliary memory array 120 are treated as an array of physical memory and all memory accesses are performed within main memory array 118.

For the fourth mode of operation, bit 202b of status register continues to disable address translation within MMU 114. Bit 202a is, however, set to enable auxiliary memory array 120. Thus, in the fourth mode, main memory array 118 and auxiliary memory array 120 are, once again, treated as an array of physical memory. Unlike operation in the third mode, accesses within the range of shadowed addresses are performed by auxiliary memory array 120.

Memory architecture 100 may also be configured to provide a fifth mode of operation. This modes of operation may be selected by CPU 110 or DSP 112 by setting bit 202c of status register 200 to disable the virtual memory system 102. For the fifth mode of operation, virtual memory system 102 is disabled and memory access are handled entirely by direct access to auxiliary memory array 120.

Figure 3E:
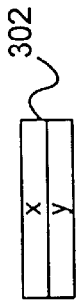
FIG. 3E is a block diagram of a memory space as provided by a fifth operational mode of a preferred mode of the present invention.
Figure 3C:
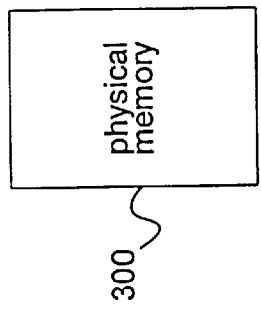
FIG. 3C is a block diagram of a memory space as provided by a third operational mode of a preferred mode of the present invention.
Figure 3D:
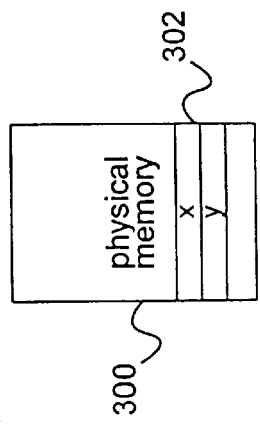
FIG. 3D is a block diagram of a memory space as provided by a fourth operational mode of a preferred mode of the present invention.
Figure 3A:
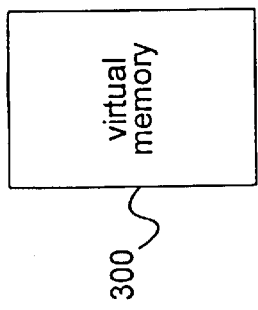
FIG. 3A is a block diagram of a memory space as provided by a first operational mode of a preferred mode of the present invention.
Figure 3B:
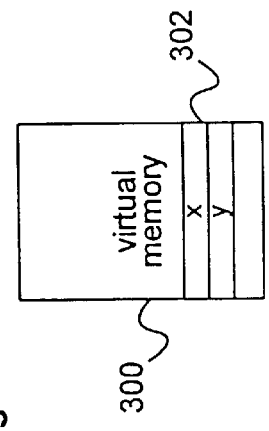
FIG. 3B is a block diagram of a memory space as provided by a second operational mode of a preferred mode of the present invention.

To clarify the five described modes of operation, FIGS. 3A through 3E shown a representative memory space 300 as provided by memory architecture 100 for each of these five modes. Starting with FIG. 3A, it may be seen that memory architecture 100, operating according to the first mode, provides a virtual memory space 300. In FIG. 3B, the virtual memory space of FIG. 3A has been modified to include the range of shadowed addresses included in auxiliary memory array 120. In FIG. 3C, which represents operation of memory architecture 100 in the third described mode, a single physical memory 300 is provided. For the fourth described mode, FIG. 3D shows the single physical memory space 300 of FIG. 3C modified to include the range of shadowed addresses included in auxiliary memory array 120. Finally, for the fifth described mode, FIG. 3E shows the single physical memory space 302 provided by auxiliary memory array 120.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A memory system for a data processing system, the memory system comprising:
    a physical memory array including an auxiliary memory array and a main memory array;
    a memory management unit including:
        an address register for receiving a memory address;
        a range detector configured to determine if the received memory address is included within a range of shadowed addresses, the range detector configured to cause the memory management unit to provide access to the auxiliary memory array if the received memory address is included within the range of shadowed addresses, the range detector configured to cause the memory management unit to provide access to the physical memory array if the received memory address is not included within the range of shadowed addresses; and
        a translation look aside buffer for translating at least a portion of the memory address to a physical address if the memory address is not within the range of shadowed addresses;
    a processor coupled to the physical memory array and to the memory management unit for generating the memory address and mode information to indicate whether to enable or disable the auxiliary memory and the translation look aside buffer; and
    a register for storing the mode information.

2. A memory system as recited in claim 1 wherein the range detector further comprises a decoder, the decoder configured to recognize a predetermined range of shadowed addresses.

3. A memory system as recited in claim 1 wherein the range detector further comprises a comparator, the comparator configured to recognize a configurable range of range of shadowed addresses.

4. A memory system for a data processing system, the memory system comprising:
    a physical memory array which includes an auxiliary memory array and a main memory array; and
    a memory management unit, including:
        means for receiving a memory address;
        means for determining if the received memory address is within a range of shadowed addresses;
        means for providing direct access to a memory location within the auxiliary memory array corresponding to the memory address if the received memory address is within the range of shadowed addresses;
        means for providing indirect access to a memory location within the physical memory array corresponding to the memory address if the received memory address is not within the range of shadowed addresses and;
        means for translating at least a portion of the memory address to a physical address if the memory address is not within the range of shadowed addresses;
    a processor coupled to the physical memory array and to the memory management unit for generating the memory address and mode information to indicate whether to enable or disable the auxiliary memory and the translation look aside buffer; and
    a register for storing the mode information.

5. A memory system as recited in claim 4 wherein the means for determining if the received memory address is within a range of shadowed addresses includes a decoder, the decoder configured to recognize a predetermined range of values within the memory address.

6. A memory system as recited in claim 4 wherein the means for determining if the received memory address is within a range of shadowed addresses includes a comparator, the comparator configured to recognize a configurable range of values within the memory address.

7. A memory system as recited in claim 4 wherein the means for determining if the received memory address is within a range of shadowed addresses examines the high-order bits of the memory address.

8. A memory system as recited in claim 4 wherein the means for providing access to a memory location within the auxiliary memory array selects the memory location within the auxiliary memory array that corresponds to the low-order bits of the memory address.

9. A method for providing access to a memory location, the method comprising:

provided a physical memory array including an auxiliary memory array and a main memory array;

receiving a memory address;

receiving mode information from a status register;

determining whether the received memory address is within a range of shadowed addresses, if the mode information indicates that the auxiliary memory is enabled;

translating the received memory address to a physical address, if the mode information indicates that address translation is enabled and if the memory address is not within the range of shadowed addresses;

providing access to a memory location within the auxiliary memory array corresponding to the memory address, if the received memory address is within the range of shadowed addresses and if the mode information indicates that the auxiliary memory is enabled;

providing access to a memory location within the main memory array corresponding to the memory address, if the mode information indicates that address translation is enabled and if the received memory address is not within the range of shadowed addresses; and providing access to a memory location within the physical memory array corresponding to the memory address, if the mode information indicates that address translation is disabled.

10. A method as recited in claim 9 wherein the step of determining if the received memory address is within a range of shadowed addresses is performed by a decoder, the decoder configured to recognize a predetermined range of values within the memory address.

11. A method as recited in claim 9 wherein the step of determining if the received memory address is within a range of shadowed addresses is performed by a comparator, the comparator configured to recognize a configurable range of values within the memory address.

* * * * *